(12) United States Patent
Barrenscheen et al.

(10) Patent No.: US 8,380,899 B2
(45) Date of Patent: *Feb. 19, 2013

(54) ARRANGEMENT COMPRISING A FIRST SEMICONDUCTOR CHIP AND A SECOND SEMICONDUCTOR CHIP CONNECTED THERETO

(75) Inventors: Jens Barrenscheen, Munich (DE); Peter Rohm, Pfaffenhofen (DE); Angela Rohm, legal representative, Pfaffenhofen (DE); Hannes Estl, Munich (DE); Axel Aue, Korntal-Muenchingen (DE); Jens Graf, Gochsheim (DE); Hermann Roozenbeek, Schwleberdingen (DE)

(73) Assignees: Infineon Technologies AG, Neubiberg (DE); Robert Bosch GmbH, Stuttgart-Feuerbach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/355,130

(22) Filed: Jan. 20, 2012

(65) Prior Publication Data

US 2012/0117283 A1   May 10, 2012

Related U.S. Application Data

(63) Continuation of application No. 10/727,102, filed on Dec. 2, 2003, now Pat. No. 8,112,563.

(30) Foreign Application Priority Data

Dec. 2, 2002   (EP) .................................... 02026775

(51) Int. Cl.
G06F 13/12 (2006.01)
G06F 13/38 (2006.01)

(52) U.S. Cl. ....................................................... 710/62

(58) Field of Classification Search .................. 710/62
See application file for complete search history.

(56) References Cited

U.S. PATENT DOCUMENTS

| | | | |
|---|---|---|---|
| 3,985,962 A | 10/1976 | Jones et al. | 370/455 |
| 5,558,178 A | 9/1996 | Hess et al. | |
| 5,600,634 A * | 2/1997 | Satoh et al. | 370/294 |
| 6,151,336 A * | 11/2000 | Cheng et al. | 370/535 |
| 6,154,509 A | 11/2000 | Bishop | 375/371 |
| 6,366,153 B1 | 4/2002 | Arslain et al. | 327/512 |
| 6,507,215 B1 | 1/2003 | Piasecki et al. | 326/41 |
| 6,578,940 B2 | 6/2003 | Elgee et al. | 347/5 |
| 6,772,251 B1 | 8/2004 | Hastings et al. | 710/100 |
| 6,826,369 B1 | 11/2004 | Bondarev et al. | 398/107 |
| 2002/0084870 A1 | 7/2002 | Cranford | 333/165 |

(Continued)

FOREIGN PATENT DOCUMENTS

| | | |
|---|---|---|
| JP | 11-163907 | 6/1999 |
| JP | 2000-307592 | 11/2000 |

OTHER PUBLICATIONS

"Data Communications Basics", Oct. 18, 1997.

(Continued)

*Primary Examiner* — Chun-Kuan Lee
(74) *Attorney, Agent, or Firm* — Dickstein Shapiro LLP

(57) ABSTRACT

A data communication method for semiconductor chips including transmitting load control data, pilot data and a transmission clock signal from a first semiconductor chip to one or more second semiconductor chips that are each coupled to one or more electrical loads, driving the electrical loads based on a timing defined by the load control data, deriving a transmission rate by dividing the transmission clock signal by a division factor prescribed by the pilot data, and transmitting diagnostic data at the transmission rate from the one or more second semiconductor chips to the first semiconductor chip.

20 Claims, 2 Drawing Sheets

U.S. PATENT DOCUMENTS

2002/0176138 A1* 11/2002 Schlanger ............... 359/172
2003/0103519 A1   6/2003 Balasundram et al. ....... 370/442

OTHER PUBLICATIONS

Barrenscheen, Jens. "Muskeln Machen: Der CAN-Bus im Einsatz mit Drehstrom-Antrieben," *ElektronikPraxis*, No. 6, Mar. 27, 1998, pp. 92-96.

Kalinsky, David., and Roee Kalinsky, "Introduction to Serial Peripheral Interface," Feb. 1, 2002, http://www.embedded.com/showArticle.jhtml?articleID=9900483.

* cited by examiner

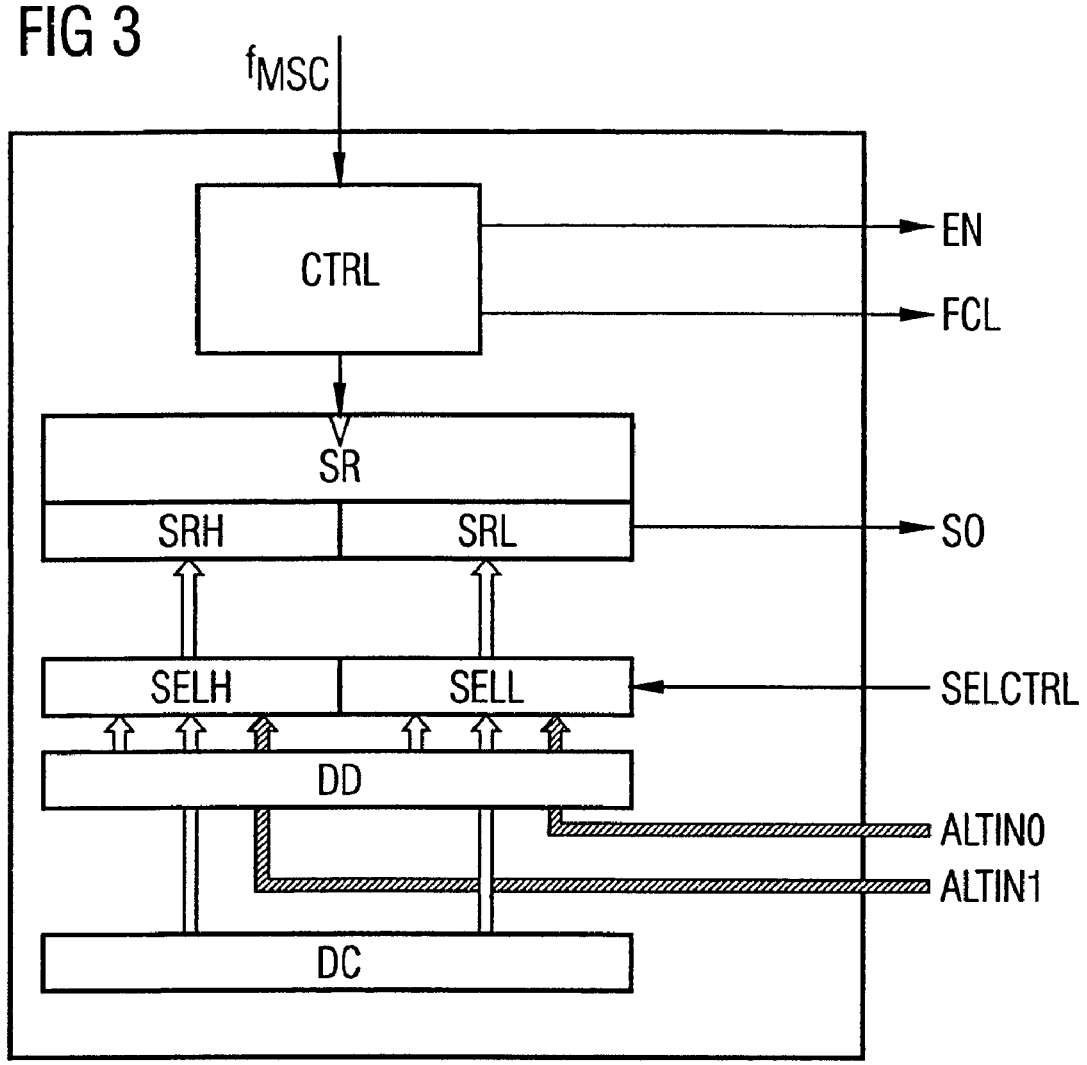
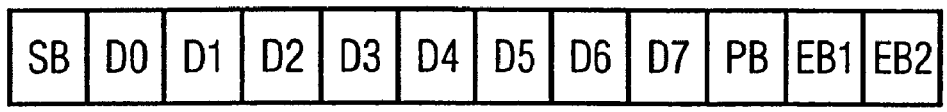

ARRANGEMENT COMPRISING A FIRST SEMICONDUCTOR CHIP AND A SECOND SEMICONDUCTOR CHIP CONNECTED THERETO

CROSS REFERENCE TO RELATED APPLICATION

This application is a continuation of U.S. patent application Ser. No. 10/727,102, entitled ARRANGEMENT COMPRISING A FIRST SEMICONDUCTOR CHIP AND A SEMICONDUCTOR CHIP CONNECTED THERETO, filed Dec. 2, 2003, which claims priority to European Patent Application No. 20020026775, filed Dec. 2, 2002, the contents of each of which are incorporated herein by reference into the present application.

FIELD OF THE INVENTION

The present invention relates to a data communication method for a first semiconductor chip and a second semiconductor chip connected to the first semiconductor chip.

BACKGROUND OF THE INVENTION

Conventional devices often include first and second semiconductor chips arranged such that
  the second semiconductor chip is additionally connected to electrical loads and drives these electrical loads on the basis of a timing which is prescribed to it by load control data,
  the first semiconductor chip transmits to the second semiconductor chip the aforementioned load control data and pilot data which control the second semiconductor chip, and
  the second semiconductor chip transmits to the first semiconductor chip diagnostic data which represent states prevailing in the second semiconductor chip or events which occur.

Such an arrangement comprises, by way of example, a microcontroller (first semiconductor chip) and power chip (second semiconductor chip), the power chip additionally being connected to electrical loads which are to be controlled.

The microcontroller executes a control program which stipulates how the electrical loads connected to the power chip need to be driven. The microcontroller does not drive the loads itself, however, but rather does so via the power chip.

In essence, the power chip does nothing other than drive the electrical loads connected to it on the basis of the stipulations received from the microcontroller.

Such arrangements are used, by way of example, when the microcontroller is not able to drive the electrical loads itself. This is the case particularly when the voltages and/or currents to be supplied to the loads are so large that the microcontroller cannot produce them itself or could produce them itself, only with an unfeasible level of complexity.

Such arrangements are used by way of example, but not exclusively, in motor vehicle control units. Motor vehicle control units have to control, inter alia, a whole series of loads by supplying power and interrupting the supply of power. In this context, most loads need to be supplied with voltages (for example 12V) and/or currents (for example 1A and above) which are so large that they cannot be produced by a microcontroller, but certainly can be produced by a power chip.

The power chip can be configured by the microcontroller and has the timing for driving the loads prescribed to it by the microcontroller.

The power chip is configured by transmitting data, subsequently referred to as pilot data, from the microcontroller to the power chip. Configuring the power chip allows a setting to be made in it regarding, by way of example, whether it is to operate in normal mode or in a special mode, for example in sleep mode.

The timing for driving the loads is prescribed by transmitting signals or data, subsequently referred to as load control data, to the power chip. The load control data used can be, by way of example, pulse-width modulated signals produced by a timer in the microcontroller.

The power chip transmits to the microcontroller status information which signals to the microcontroller the states prevailing in the power chip or events which occur. The status information is transmitted to the microcontroller by transmitting data which are subsequently referred to as diagnostic data. These diagnostic data make it possible to signal to the microcontroller that a load is drawing too much current or that there is overheating, for example.

In arrangements of the type described above, one problem is the transmission of the load control data.

Until recently, they were transmitted such that each of the loads connected to the power chip had a dedicated pulse-width modulated signal transmitted to the power chip on a dedicated line.

This type of load control data transmission is disadvantageous because the microcontroller and the power chip in this case need to be connected to one another by means of a very large number of lines and need to have a correspondingly large number of input and/or output connections.

This problem has now since been recognized and has been alleviated by developing the "microsecond bus". The microsecond bus has the particular feature that the load control signals which were previously transmitted to the power chip in parallel are sampled at regular intervals of time, for example at 1 ps intervals of time, and that the samples are transmitted to the power chip serially via a single transmission channel. The power chip reconstructs the sampled pulse-width modulated signals from the data supplied to it and drives the loads connected to it accordingly. This makes it possible to achieve a considerable reduction in the lines which need to be provided between the microcontroller and the power chip, and the number of input and/or output connections which need to be provided on the microcontroller and on the power chip is also correspondingly smaller.

The basic design of an arrangement in which a microcontroller and a power chip are connected to one another via a microsecond bus is illustrated in FIG. 1.

FIG. 1 shows a microcontroller MC, a power chip PC and a microsecond bus MSB which connects the microcontroller and the power chip.

The microcontroller MC contains a central processing unit CPU, a timer T1, a microsecond bus controller MSC and various further units P1 to Pn, said components being connected to one another via an internal system bus SYSBUS.

The timer T1 produces pulse-width modulated signals which prescribe the timing for driving the loads and supplies these signals to the microsecond bus controller MSC via the system bus SYSBUS. In the example under consideration, the timer produces a total of 16 output signals, each of which comprises one bit, and indicates whether or not a condition which has been set in the timer and is associated with the respective timer output signal has been satisfied. The timer output signals are transmitted to the microsecond bus controller MSC at particular intervals of time, for example at 1 µs intervals of time, and the microsecond bus controller transmits these signals to the power chip PC serially via the microsecond bus MSB.

The microsecond bus MSB comprises a first transmission channel TC1 and a second transmission channel TC2, the first transmission channel TC1 comprising lines DATA1*a*, DATA1*b*, CLK1 and CS1 and the second transmission channel TC2 comprising lines DATA2, CLK2 and CS2.

Using the line CLK2, the microcontroller MC transmits a transmission clock signal to the power chip PC.

Using the line DATA2, the microcontroller MC transmits the respective current levels of the timer output signals, that is to say the load control data, to the power chip PC serially in time with the transmission clock signal transmitted via the line CLK2.

Using the line CS2, the microcontroller MC transmits to the power chip PC a chip select signal which signals to the power chip the start and end of the transmission of data intended for the power chip via the line DATA2.

Using the line CLK1, the microcontroller MC transmits a transmission clock signal to the power chip PC.

Using the line DATA1*a*, the microcontroller MC transmits pilot data to the power chip PC serially in time with the transmission clock signal transmitted via the line CLK1, and, synchronously therewith, the power chip PC uses the line DATA1*b* to transmit diagnostic data to the microcontroller serially.

Using the line CS1, the microcontroller MC transmits to the power chip PC a chip select signal which signals to the power chip the start and end of the transmission of data intended for the power chip via the line DATA1*a*.

As can be seen from the explanations above, the use of the microsecond bus allows a significant reduction in the number of lines between the microcontroller MC and the power chip PC and hence also in the number of input and/or output connections on the microcontroller and on the power chip. It is now necessary to provide only 7 lines between the microcontroller MC and the power chip PC; for transmitting the timer output signals via a respective dedicated line, 16 lines would need to be provided just for transmitting the timer output signals.

Nevertheless, the use of a microsecond bus is not yet optimal.

First, it would be desirable to be able to reduce the number of lines which need to be provided between the microcontroller and the power chip even further.

Secondly, the synchronous bidirectional transmission of the pilot data and of the diagnostic data via the lines DATA1*a* and DATA1*b* is complex and problematical. In particular, above all with relatively long line lengths and the resultant long signal propagation times, it is necessary to work at a relatively low data transmission rate, which means that it can become difficult to transmit the pilot data and diagnostic data in full.

The problem just mentioned could be eliminated by using the first transmission channel TC1 to transmit only the pilot data, and by using a third transmission channel to transmit the diagnostic data. However, this would run against the desire to reduce the number of lines which need to be provided between the microcontroller and the power chip.

SUMMARY OF THE INVENTION

The present invention is therefore based on the object of developing a data communication method for semiconductor chips such that the data to be transferred between the first semiconductor chip and the second semiconductor chip can be transmitted via a small number of lines and in full under all circumstances.

The inventive method is distinguished in that the diagnostic data are transmitted via a first transmission channel and the load control data and the pilot data are transmitted via a second transmission channel.

By virtue of the data communication method, which does not involve a need for bidirectional transmission of data on any of the transmission channels, there are no or only relatively slight limitations for the data transmission rate at which the data can be transmitted. As a result, the data to be transmitted between the semiconductor chips can be transmitted at arbitrarily high data transmission rates, that is to say in full under all circumstances.

Since, secondly, there is no need for an additional transmission channel, the number of lines which need to be provided between the semiconductor chips also does not increase. Quite the opposite: since the diagnostic data to be transmitted via the first transmission channel are generally very small in scope, the diagnostic data can be transmitted asynchronously, for example, which means that the first transmission channel does not need to comprise a dedicated transmission clock line, and therefore the number of lines needing to be provided between the semiconductor chips can even be reduced.

Advantageous developments of the data communication method can be found in the description below and in the figures.

BRIEF DESCRIPTION OF THE DRAWINGS

The invention is explained in more detail below using exemplary embodiments with reference to the figures, in which:

FIG. 3 shows the design of a portion of the microsecond bus controller contained in the arrangement shown in FIG. 2; and FIG. 4 shows the design of a diagnostic data frame.

DETAILED DESCRIPTION OF THE DRAWINGS

The arrangement described below comprises a program-controlled unit and a power chip connected thereto, where the power chip is additionally connected to electrical loads and drives these electrical loads on the basis of a timing which is prescribed to it by load control data, where the program-controlled unit transmits to the power chip the aforementioned load control data and pilot data which control the power chip, and where the power chip transmits to the program-controlled unit diagnostic data which represent states prevailing in the power chip or events which occur.

In the example under consideration, the programcontrolled unit is a microcontroller, but could also be a microprocessor or a signal processor, for example.

However, the particular features of the arrangements described below can also be used for other arrangements in which said data need to be transmitted. That is to say, both the microcontroller and the power chip could also be any other chips.

Figure 2:
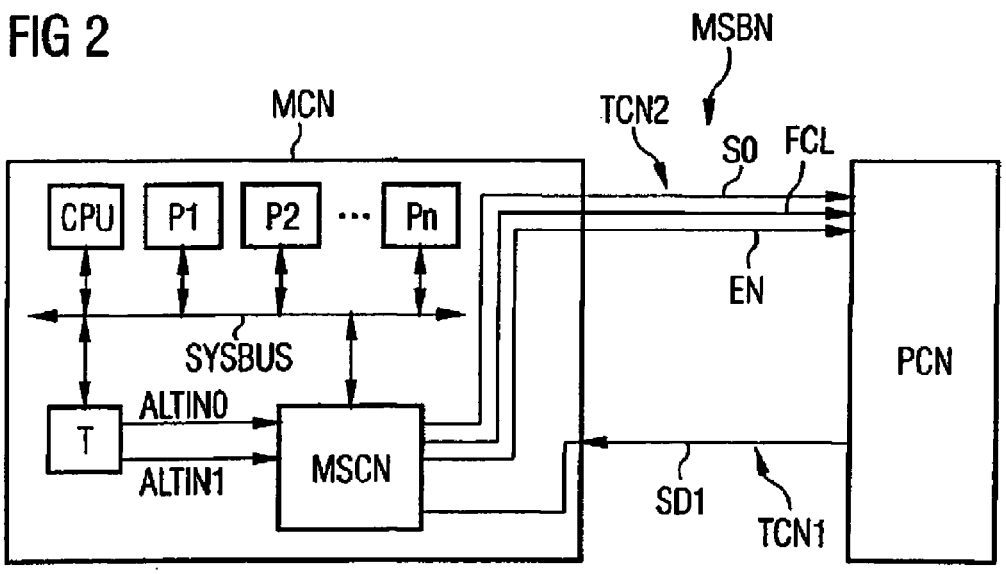
FIG. 2 shows the design of the arrangement described below.

FIG. 2 shows the basic design of an exemplary embodiment of the arrangement presented here.

The arrangement shown in FIG. 2 contains a microcontroller MCN, a power chip PCN and a modified microsecond bus MSBN which connects said chips to one another.

Figure 1:
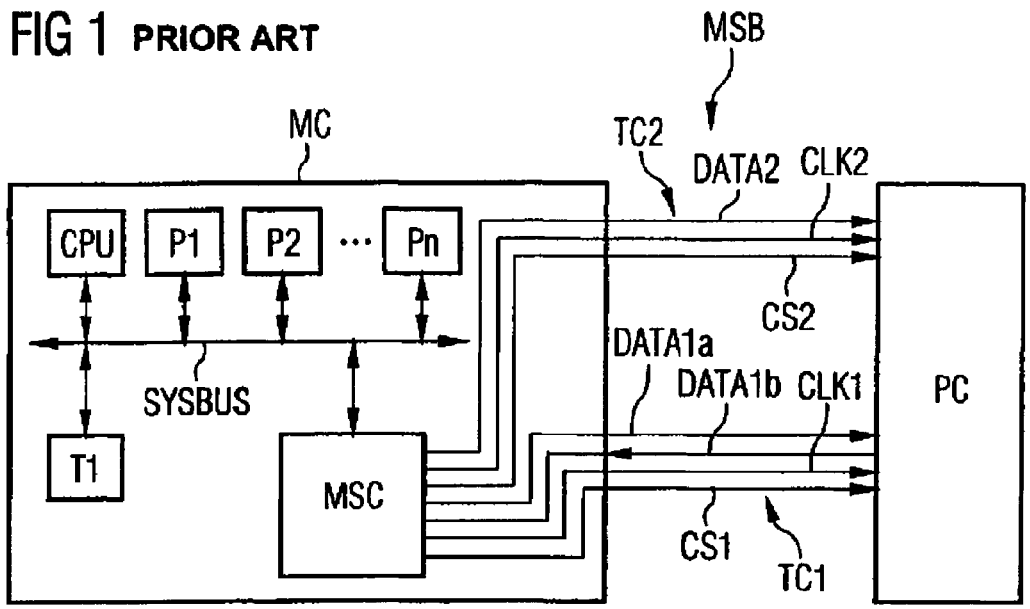
FIG. 1 shows the design of the conventional arrangement described at the outset.

The modified microsecond bus MSBN is a secondgeneration microsecond bus and is subsequently referred to as the microsecond bus for the sake of simplicity. However, this does not mean that this is the microsecond bus described at the outset with reference to FIG. 1. In contrast to the first-generation microsecond bus described at the outset, the second-generation microsecond bus described here has a whole series of differences which will be described more precisely at a later point.

The microcontroller MCN contains a central processing unit CPU, a timer TI a microsecond bus controller MSCN and various further units P1 to Pn, said components being connected to one another via an internal system bus SYSBUS, and the timer T in the microsecond bus controller MSCN being connected to one another via additional internal buses ALTIN0 and ALTIN1.

The timer T produces the timer output signals which are to be transmitted to the power chip PCN and supplies them to the microsecond bus controller MSCN via the buses ALTIN0 and ALTIN1. In the example under consideration, the timer produces a total of 32 output signals, each of which comprises one bit, and indicates whether or not a condition which has been set in the timer and is associated with the respective timer output signal has been satisfied. The timer output signals are transmitted to the microsecond bus controller MSCN at particular intervals of time, for example at 1 μs intervals of time, and said microsecond bus controller transmits these signals to the power chip PCN serially via the microsecond bus MSBN.

The microsecond bus MSBN comprises a first transmission channel TCN1 and a second transmission channel TCN2, the first transmission channel TCN1 comprising a single line SD1 and the second transmission channel TCN2 comprising lines SO, FCL and EN.

Using the line FCL, the microcontroller MCN transmits a transmission clock signal to the power chip PCN. The line FCL corresponds to the line CLK2 in the conventional arrangement shown in FIG. 1. However, the transmission clock signal transmitted via the line FCL will generally have a higher frequency than the transmission clock signal transmitted via the line CLK2.

Using the line SO, the microcontroller MCN transmits load control data and pilot data to the power chip PCN serially in time with the transmission clock signal transmitted via the line FCL. The load control data have the same content as the data transmitted to the arrangement shown in FIG. 1 via the line DATA2. However, pilot data can be transmitted between the load control data. The data to be transmitted via the line SO are thus transmitted using timedivision multiplexing. This is described more precisely at a later point.

Using the line EN, the microcontroller MCN transmits to the power chip PCN a chip select signal which signals to the power chip the start and end of the transmission of data intended for the power chip via the data line SO. The line EN corresponds to the line CS in the conventional arrangement shown in FIG. 1.

Using the line SD1, the power chip PCN transmits diagnostic data serially to the microcontroller. The diagnostic data are preferably transmitted asynchronously. These and other transmission options will be described more precisely at a later point.

As mentioned, the data to be transmitted via the line SO, that is to say the load control data and the pilot data, are transmitted using time-division multiplexing.

The microsecond bus controller MSCN internally generates time windows of constant length and, in each time window, transmits load control data, pilot data or no data, as alternatives. Transmission of the respective data which are to be transmitted is always started at the start of a time window. In the example under consideration, the load control data are transmitted such that a time window in which load control data have been transmitted to the power chip is always followed by n time windows in which no load control data are transmitted to the power chip, which thus means that load control data are transmitted to the power chip in every n+1th time window; where n is a value which can be set by the microcontroller's CPU, and is between 0 and 15 in the example under consideration. In the time windows which are not reserved for transmitting load control data, it is possible to transmit pilot data to the power chip.

A special case exists when n=0. In this case, there are no time windows which are not reserved for transmitting load control data. When n=0, the procedure is therefore such that the transmission of pilot data has priority over the transmission of load control data. That is to say, when the microsecond bus controller MSCN contains pilot data to be transmitted to the power chip, these pilot data are transmitted instead of the load control data which actually need to be transmitted. Provision can also be made for the transmission of pilot data to have priority over the transmission of load control data when n is between 1 and 15.

In the example under consideration, the load control data transmitted per time window respectively comprise 32 bits, each of which is intended for controlling a different load; the microcontroller can control up to 32 loads in the example under consideration. The pilot data transmitted per time window likewise respectively comprise 32 bits in the example under consideration, but can also comprise more bits or fewer bits. Both the load control data and the pilot data are transmitted together with information which can be used by the power chip to ascertain whether the respective data transmitted are load control data or pilot data.

The design of the portion of the microsecond bus controller MSCN which outputs the data transmitted via the lines FCL, SO and EN onto these lines is described below with reference to FIG. 3.

The portion of the microsecond bus controller MSCN shown comprises a control device CTRL, a shift register unit SR comprising shift registers SRH and SRL, selection devices SELH and SELL, a data register DD and a command register DC.

The control device CTRL
  takes a clock signal $f_{MSC}$ supplied to the control device,
    produces the transmission clock signal needing to be transmitted via the line FCL and outputs said transmission clock signal onto the line FCL,
  produces the chip select signal needing to be transmitted via the line EN and outputs said chip select signal onto the line EN, and
  controls the shift register unit SR.

The command register DC is a 32-bit register storing pilot data which need to be transmitted to the power chip. These data are produced by the CPU and are written to the command register DC via the system bus SYSBUS.

The data register DD is a 32-bit register storing load control data. These data are produced by the CPU and are written to the data register DC via the system bus SYSBUS.

The selection devices SELH and SELL are devices which are connected upstream of the shift registers SRH and SRL and which determine what data are written to the shift registers.

The selection device SELL is supplied with the 16 least significant bits of the command register DC, with the 16 least significant bits of the data register DD and with the 16-bit data transmitted via bus ALTIN0. The selection device SELH is supplied with the 16 most significant bits of the command register DC, with the 16 most significant bits of the data register DD and with the likewise 16-bit data transmitted via bus ALTIN1. The selection devices SELL and SELH have a control connection SELCTRL which can be used to set which of the data supplied to the selection devices SELL and SELH are forwarded to the shift registers SRL and SRH. The stipulation is made bit by bit. That is to say, each individual bit of the data forwarded to the shift registers SRL and SRH can have a stipulation regarding from which source it originates.

The selection devices SELL and SELH are controlled by the microcontroller's CPU or by the control device CPRL.

The data forwarded to the shift registers SRL and SRH are accepted by these in parallel and are then output onto the line SO serially in time with the transmission clock .signal transmitted via the line FCL.

Simultaneously with the start of transmission of data via the line SO, the chip select signal transmitted via the line EN changes from the low level to the high level (or vice versa). When the data to be transmitted within a time window have been transmitted, to be more precise essentially simultaneously therewith, the chip select signal changes back from the high level to the low level (or vice versa). The chip select signal signals to the power chip the start and end of the transmission of data intended for the power chip via the line SO.

The microsecond bus controller MSCN is able to drive a plurality of power chips. As a result, the microsecond bus controller MSCN can also guide more loads than would be the case if the microsecond bus controller MSCN could drive just a single power chip.

If the microsecond bus controller MSCN is intended to be able to drive loads connected to different power chips, an additional chip select line EN needs to be provided for each further power chip. Hence, if the microsecond bus controller MSCN is intended to be able to transmit load control data to four power chips, for example, then four chip select lines EN1 to EN4 need to be provided, each of these chip select lines being connected to precisely one power chip, that is to say the chip select line EN1 to the first power chip, the chip select line EN2 to the second power chip, the chip select line EN3 to the third power chip and the chip select line EN4 to the fourth power chip, for example. However, it is not necessary to .provide a plurality of lines FCL for a plurality of .lines SO. The existing single FCL line and the existing single SO line are respectively connected to all of the power chips. That power chip for which the data and signals transmitted via the lines FCL and SO are intended is signaled to the power chips by the chip select signals transmitted via the chip select lines EN1 to EN4.

The microsecond bus controller MSCN under consideration has the particular feature that the load control data output within a time window can be intended for different power chips, that is to say the first 16 bits of these data for a first power chip and the remaining 16 bits for another power chip, for example. That is to say, the microsecond bus controller MSCN under consideration is able to change over the chip select signals during the transmission of the load control data transmitted as a cohesive unit. This is incidentally the reason why the shift register unit SR does not just contain a single, 32-bit shift register but rather two 16-bit shift registers SRL and SRH.

As already mentioned above, the diagnostic data transmitted from the power chip to the microcontroller via the line SD1 are preferably transmitted asynchronously. The diagnostic data are transmitted in units of frames which each comprise 12 bits in the example under consideration. The design of such a frame is illustrated in FIG. 4.

The frame shown in FIG. 4 contains
a start bit SB, used for synchronization, which always has the value "0" in the example under consideration,
8-bit diagnostic data D0 to D7,
a parity bit PB used for error control,
two stop bits EB1 and EB2, used for synchronization, which always have the value "1" in the example under consideration.

It ought to be clear and requires no further explanation that the frame could also have a different design. In particular, the diagnostic data can have any number more or fewer bits, as the frame does not necessarily have to contain a parity bit. In addition, provision could, be made for the frame to contain just one stop bit.

The transmission clock which the power chip uses to transmit the bits of the diagnostic data frames is generated by the power chip from the transmission clock which is transmitted to it via the line FCL: the power chip divides the transmission clock supplied to it via the line FCL by a division factor which is prescribed to it and uses the resultant clock as the transmission clock for transmitting the diagnostic data. The division factor is prescribed to the power chip by the microcontroller. The microcontroller transmits pilot data, which contain the division factor which is to be used, inter alia, to the power chip when the latter is initialized.

Since the transmission clock used for transmitting the diagnostic data is produced in the power chip according to the microcontroller's stipulations and is therefore known to the microcontroller, a clock signal representing the transmission clock which is to be used or is used for transmitting the diagnostic data needs to be transmitted neither from the microcontroller to the power chip nor from the power chip to the microcontroller. As a result, the transmission clock line CLK1 still present in the first-generation microsecond bus can be eliminated without replacement.

Since the line SD1 is only used to transmit data from the power chip to the microcontroller, the chip select line CS1 still present in the first-generation microsecond bus can also be eliminated without replacement.

The same positive effects could be achieved if the start and stop bits in the diagnostic data frames are omitted as the microcontroller ascertains the phase of the diagnostic data by oversampling the diagnostic data.

Another alternative involves the first transmission channel TCN1 also comprising a transmission clock line via which a transmission clock signal is transmitted from the microcontroller to the power chip or from the power chip to the microcontroller, and the power chip transmitting the diagnostic data in time with this transmission clock signal. To this end, although it is necessary to provide an additional line, the total number of lines needing to be provided between the microcontroller and the power chip is still smaller in this case than in the case of the first-generation microsecond bus described at the outset.

Particularly if the microcontroller and the power chip are a long way from one another, that is to say that long lines need to be provided between them, the output drivers in a microcontroller need to be very powerful drivers. This can result in severe electromagnetic interference.

To avoid this, provision can be made for special drivers to be used which cause only relatively weak electromagnetic interference. Such drivers are the Low Voltage Differential Signaling (LVDS) drivers, for example. When using LVDS drivers, the data to be transmitted are transmitted on two lines instead of just on one line, with one line being used to transmit the data and signals which are actually to be transmitted, and the other line being used to transmit complementary data and signals.

If the microcontroller has such drivers, it transmits the data which it transmits via the line SO in the exemplary embodiment which is shown in FIGS. 2 and 3 and is described with reference thereto via two lines SOP and SON, the line SOP being used to transmit the data which are transmitted via the line SO in the exemplary embodiments shown in FIGS. 2 and 3, and the line SON being used to transmit the complementary data, i.e., the data inverted by an inverter. A.similar situation applies for the data which are transmitted via the line FCL in the exemplary embodiment which is shown in FIGS. 2 and 3 and is described with reference thereto. When using LVDS drivers, these data and signals are transmitted via two lines FCLP and FCLN, the line FCLP being used to transmit the data which are transmitted via the line FCL in the exemplary embodiments shown in FIGS. 2 and 3, and the line FCLN being used to transmit the complementary data, i.e., the data inverted by an inverter.

For the data transmitted via the lines EN and SD1, it is not necessary to use any LVDS drivers or other EMC-optimized drivers, because the data transmitted using them change their level comparatively rarely and consequently cause only little electromagnetic interference.

Provision could also be made for the data and signals transmitted via the lines FCL and SO to be provided both with normal drivers and with LVDS drivers, and for the microcontroller to have connections for lines FCL, FCLP and FCLN and also for lines SO, SOP and SON. In this case, the respective circumstances could be taken as a basis for whether the load control data and the pilot data are transmitted by a normal driver and a single line SO or by LVDS drivers and two lines SOP and SON, and whether the transmission clock signal is transmitted by a normal driver and a single line FCL or by LVDS drivers and two lines FCLP and FCLN.

We claim:

1. A data communication method for semiconductor chips comprising:
   transmitting load control data, pilot data and a transmission clock signal from a first semiconductor chip to at least one second semiconductor chip, which is coupled to at least one electrical load;
   driving the at least one electrical load based on a timing defined by the load control data;
   deriving a transmission rate by dividing the transmission clock signal by a division factor prescribed by the pilot data; and
   transmitting diagnostic data at the transmission rate from the at least one second semiconductor chip to the first semiconductor chip.

2. The data communication method of claim 1, further comprising transmitting a chip select signal from the first semiconductor chip to the at least one second semiconductor chip to signal the start and end of the transmission of the load control data and pilot data intended for the at least one second semiconductor chip.

3. The data communication method of claim 1, wherein the first semiconductor chip is a program-controlled unit.

4. The data communication method of claim 1, wherein the at least one second semiconductor chip is a power chip.

5. The data communication method of claim 1, further comprising transmitting the load control data and pilot data in units of frames using time-division multiplexing.

6. The data communication method of claim 5, further comprising:
   defining time windows of constant length; and
   transmitting in each time window either a load control data frame or a pilot data frame or no data.

7. The data communication method of claim 6, further comprising transmitting no further load control data frames for a respective length of n time windows after transmission of a load control data frame, wherein n≧0.

8. The data communication method of claim 6, further comprising prioritizing the transmission of pilot data frames when a load control data frame and a pilot data frame are awaiting transmission simultaneously.

9. The data communication method of claim 1, further comprising transmitting the diagnostic data in units of frames, wherein a frame starts with a start bit having a prescribed value and ends with one or two stop bits having prescribed values.

10. The data communication method of claim 1, further comprising oversampling the diagnostic data to ascertain the phase of the diagnostic data.

11. The data communication method of claim 1, wherein the diagnostic data represents at least one of states prevailing in the at least one second semiconductor chip and events occurring in the at least one second semiconductor chip.

12. A data communication method for semiconductor chips comprising:
   transmitting load control data, pilot data and a transmission clock signal to at least one semiconductor chip, which is coupled to at least one electrical load; and
   receiving diagnostic data at a transmission rate from the at least one semiconductor chip,
   wherein the transmission rate is defined by the transmission clock signal divided by a division factor prescribed by the pilot data.

13. The data communication method of claim 12, further comprising transmitting a chip select signal to the at least one semiconductor chip to signal the start and end of the transmission of the load control data and pilot data.

14. The data communication method of claim 12, further comprising transmitting the load control data and pilot data in units of frames using time-division multiplexing.

15. The data communication method of claim 14, further comprising:
   defining time windows of constant length; and
   transmitting in each time window either a load control data frame or a pilot data frame or no data.

16. The data communication method of claim 15, further comprising transmitting no further load control data frames for a respective length of n time windows after transmission of a load control data frame, wherein n≧0.

17. The data communication method of claim 15, further comprising prioritizing the transmission of pilot data frames when a load control data frame and a pilot data frame are awaiting transmission simultaneously.

18. The data communication method of claim 12, further comprising oversampling the diagnostic data to ascertain the phase of the diagnostic data.

19. A data communication method for semiconductor chips comprising:
   receiving load control data, pilot data and a transmission clock signal from a semiconductor chip;
   driving at least one electrical load based on a timing defined by the load control data;

deriving a transmission rate by dividing the transmission clock signal by a division factor prescribed by the pilot data; and transmitting diagnostic data at the transmission rate to the semiconductor chip.

20. The data communication method of claim 19, further comprising transmitting the diagnostic data in units of frames, wherein a frame starts with a start bit having a prescribed value and ends with one or two stop bits having prescribed values.

* * * * *